(12) United States Patent
Chien

(10) Patent No.: US 6,442,224 B1
(45) Date of Patent: Aug. 27, 2002

(54) MIXING AND SEPARATING METHOD FOR A PLURALITY SIGNALS

(76) Inventor: Chin-Yang Chien, 5F, No.4, Aly.3, Ln.101, Chien An St., HsinChuan City, Taipei (TW)

( * ) Notice: Subject to any disclaimer, the term of this patent is extended or adjusted under 35 U.S.C. 154(b) by 0 days.

(21) Appl. No.: 09/246,000

(22) Filed: Feb. 5, 1999

(51) Int. Cl.[7] .............................. H04L 7/04; H04L 7/00
(52) U.S. Cl. ...................................... 375/362; 375/354
(58) Field of Search ................................ 375/362, 354, 375/355, 219; 708/400

(56) References Cited

U.S. PATENT DOCUMENTS 6,137,848 A * 10/2000 Ho et al. ..................... 375/354
6,148,024 A * 11/2000 Ho et al. ..................... 375/222

* cited by examiner

Primary Examiner—Chi Pham
Assistant Examiner—Khai Tran

(57) ABSTRACT

A method and device for mixing and separating a plurality signals. In the mixing method, each of the m signal $S_i(t)$ to be mixexd within a time perid $[T_0, T_1]$ is sampled for n samples $S_i(t_j)$, $j=1,2 \ldots n$, wherein $t \in [T_0, T_1]$, $T_0, T_1 \in R$, t is time variable. Each sample is multiplied by a coefficient function $_i a_j(t)$ which is a linear independent set ($i=1,2 \ldots m$, $j=1,2 \ldots n$), thus obtaining m transformed signals for $S_i(t)$:

$$S_i^0(t) = \sum_{j=1}^{n} [_i a_j(t) S_i(t_j)].$$

By summing above m transformed signals obtains the mixed transformed signals are obtained:

$$SM(t) = \sum_{i=1}^{m} [S_i^0(t)].$$

As to the separating method, the coefficient function $_i a_j(t)$ is a linear independent set ($i=1,2 \ldots m$, $j=1,2 \ldots n$), therefore $S_i(t_j)$ are the unknown of m×n linear equation set and can be solved by known linear algebraic method.

24 Claims, 12 Drawing Sheets

MIXING AND SEPARATING METHOD FOR A PLURALITY SIGNALS

FIELD OF THE INVENTION

This invention relates to a mixing and separating method for a plurality signals, more particularly, to achieve control circuit for signal processing.

BACKGROUND OF THE INVENTION

The electronic communication has grown more and more prosperous and the problem of available of communication channel becomes even serious. The bandwidth of a specific communication medium is limited, therefore how to most exploit the avail bandwidth is essential. It is the object of the invention to provide a method for transmitting a plurality of signals in a pair of transmission line or a single channel.

SUMMARY OF THE INVENTION

Principles of the Invention I

The present invention is based on the principle of unique solution condition for a set of N linearly equations, i.e., linearly independence. Based on this principle, each of the m signal $S_i(t)$ within period $[T_0, T_1]$ is sampled for n samples $S_i(t_j)$, $j=1,2 \ldots n$, wherein $t \in [T_0, T_1]$, $T_0, T_1 \in R$, t is time variable. Each sample is multiplied by a coefficient function $_i a_j(t)$ which is a linear independent set ($i=1,2 \ldots m, j=1, 2 \ldots n$), thus obtaining m transformed signals for $S_i(t)$:

$$S_i^0(t) = \sum_{j=1}^{n} [_i a_j(t) S_i(t_j)]$$

summing above m transformed signals obtains the mixed transformed signals:

$$SM(t) = \sum_{i=1}^{m} [S_i^0(t)]$$

The mixed transformed signals have m×n variables $S_i(t_j)$ with coefficient $_i a_j(t)$. If party A transmits SM(t) during time $[T_0, T_1]$ to party B, party B will obtain message of m×n $S_i(t_j)$, ($i=1,2 \ldots m, j=1,2 \ldots n$), wherein the bandwidth depends on the max bandwidth of $_i a_j(t)$. More particularly, party A can m messages $S_i(t)$ ($i=1,2 \ldots m$) to party B during time $[T_0, T_1]$, if the samples (unknowns) $S_i(t_1)$, $S_i(t_2)$, $S_i(t_3) \ldots S_i(t_n)$, (($i=1,2 \ldots m$) are sufficient to represent $S_i(t)$ ($i=1,2 \ldots m$) during time $[T_0, T_1]$.

The party B can resolve $S_i(t_j)$ upon receiving SM(t) if m×n−1 differential means are provided to obtain differential signals SM'(t), SM''(t) ... $SM^{m \times n-1}(t)$:

$$\sum_{i=1}^{m} \sum_{j=1}^{n} [_i a_j(t) S_i(t_j)] = SM(t) \quad (1)$$

$$\sum_{i=1}^{m} \sum_{j=1}^{n} [_i a'_j(t) S_i(t_j)] = SM'(t)$$

$$\vdots$$

$$\sum_{i=1}^{m} \sum_{j=1}^{n} [_i a_j^{(m \times n-1)}(t) S_i(t_j)] = SM^{m \times n-1}(t)$$

Eq(1) is an m×n equation set, wherein functions $_i a_j(t)$ ($i=1,2 \ldots m, j=1,2 \ldots n$) are linear independent. Therefore, $S_i(t_j)$ in Eq(1) has unique solution because the Wronskin (determinant) of functions $_i a_j(t)$ is not equal to zero.

Therefore, the $S_i(t_j)$ can be calculated by choosing a specific time $t_0$ within $[T_0, T_1]$ and obtain $_i a_j^{(u)}(t_0)$ and $SM^{(u)}(t_0)$. Moreover, each $S_i(t)$ can be calculated ($i=1,2 \ldots m, j=1,2 \ldots n, u=0, 1,2 \ldots m \times n-1$).

Principles of the Invention II

The above solving procedure requires m×n−1 differential means to solve $S_i(t)$, the hardware structure is bulky. However, party B can also take m×n samples after receiving SM(t):

$$\sum_{i=1}^{m} \sum_{j=1}^{n} [_i a_j(t_1) S_i(t_j)] = SM(t_1) \quad (2)$$

$$\sum_{i=1}^{m} \sum_{j=1}^{n} [_i a_j(t_2) S_i(t_j)] = SM(t_2)$$

$$\vdots$$

$$\sum_{i=1}^{m} \sum_{j=1}^{n} [_i a_j(t_{m \times n}) S_i(t_j)] = SM(t_{m \times n})$$

wherein $t_1, t_2 \ldots t_{m \times n}$ are all within $[T_0, T_1]$ and $t_u \neq t_v$ if $u \neq v$, ($u, v = 0,1,2 \ldots m \times n$). $S_i(t)$ has unique solution because $_i a_j(t)$ ($i=1,2 \ldots m, j=1,2 \ldots n$) are linear independent in $[T_0, T_1]$.

Principles of the Invention III

In above scheme, party requires to take m×n samples within $[T_0, T_1]$ even thought the differential means can be saved. The sample frequency will increase when the number of signal (m) increases. Therefore, the sampling rate of the A/D should be considered to determine the number of signal m.

To increase m and keep hardware compact, a compromise is to use m−1 differential means to get m differential signals (including original SM(t)), and to take n samples for each signal within $[T_0, T_1]$ thus obtaining following equation set:

$$\sum_{i=1}^{m} \sum_{j=1}^{n} [_i a_j(t_1) S_i(t_j)] = SM(t_1) \quad (3)$$

$$\sum_{i=1}^{m} \sum_{j=1}^{n} [_i a_j(t_2) S_i(t_j)] = SM(t_2)$$

$$\vdots$$

$$\sum_{i=1}^{m} \sum_{j=1}^{n} [_i a_j(t_n) S_i(t_j)] = SM(t_n)$$

$$\sum_{i=1}^{m} \sum_{j=1}^{n} [_i a'_j(t_1) S_i(t_j)] = SM'(t_1)$$

$$\sum_{i=1}^{m} \sum_{j=1}^{n} [_i a'_j(t_2) S_i(t_j)] = SM'(t_2)$$

$$\vdots$$

$$\sum_{i=1}^{m} \sum_{j=1}^{n} [_i a'_j(t_n) S_i(t_j)] = SM'(t_n)$$

$$\vdots$$

-continued $$\sum_{i=1}^{m}\sum_{j=1}^{n}[_i a_j^{(m-1)}(t_n)S_i(t_j)] = SM^{(m-1)}(t_n)$$

$_i a_j(t)$ (i=1,2 ... m, j=1,2 ... n) are linear independent. Therefore, $S_i(t_i)$ in Eq(3) has unique solution because the Wronskin (determinant) of functions $_i a_j(t)$ is not equal to zero.

Party B has a plurality of ways to create m×n linear independent equation set form SM(t) as will be described below.

$$\sum_{i=1}^{m}\sum_{j=1}^{n}[_i a_j(t_1)S_i(t_j)] = SM(t_1) \qquad (4)$$

$$\sum_{i=1}^{m}\sum_{j=1}^{n}[_i a_j(t_2)S_i(t_j)] = SM(t_2)$$

$$\vdots$$

$$\sum_{i=1}^{m}\sum_{j=1}^{n}[_i a_j(t_n)S_i(t_j)] = SM(t_n)$$

$$\sum_{i=1}^{m}\sum_{j=1}^{n}\left[\frac{1}{D}\,_i a_j(t_1)S_i(t_j)\right] = \frac{1}{D}SM(t_1)$$

$$\sum_{i=1}^{m}\sum_{j=1}^{n}\left[\frac{1}{D}\,_i a_j(t_2)S_i(t_j)\right] = \frac{1}{D}SM(t_2)$$

$$\sum_{i=1}^{m}\sum_{j=1}^{n}\left[\frac{1}{D}\,_i a_j'(t_n)S_i(t_j)\right] = \frac{1}{D}SM(t_n)$$

$$\vdots$$

$$\sum_{i=1}^{m}\sum_{j=1}^{n}\left[\frac{1}{D^{m-1}}\,_i a_j(t_n)S_i(t_j)\right] = \frac{1}{D^{m-1}}SM(t_n)$$

wherein $$\frac{1}{D^u}\,_i a_j(t_v)$$

and $$\frac{1}{D^u}SM(t_v)$$

is uth integration of $_i a_j(t)$ and SM(t) from 0 to $t_v$, u=1, 2 ... m−1, v=1,2 ... n.

Another alternative is:

$$\sum_{i=1}^{m}\sum_{j=1}^{n}[_i a_j(t_1)S_i(t_j)] = SM(t_1) \qquad (5)$$

$$\sum_{i=1}^{m}\sum_{j=1}^{n}[_i a_j(t_2)S_i(t_j)] = SM(t_2)$$

$$\vdots$$

$$\sum_{i=1}^{m}\sum_{j=1}^{n}[_i a_j(t_n)S_i(t_j)] = SM(t_n)$$

-continued $$\sum_{i=1}^{m}\sum_{j=1}^{n}[\Delta\,_i a_j(t_1)S_i(t_j)] = \Delta SM(t_1)$$

$$\sum_{i=1}^{m}\sum_{j=1}^{n}[\Delta\,_i a_j(t_2)S_i(t_j)] = \Delta SM(t_2)$$

$$\sum_{i=1}^{m}\sum_{j=1}^{n}[\Delta\,_i a_j(t_n)S_i(t_j)] = \Delta SM(t_n)$$

$$\vdots$$

$$\sum_{i=1}^{m}\sum_{j=1}^{n}[\Delta^{m-1}\,_i a_j(t_n)S_i(t_j)] = \Delta^{m-1}SM(t_n)$$

wherein $\Delta^u\,_i a_j(t_v)$ and $\Delta^u SM(t_v)$ is uth differential of $_i a_j(t)$ and SM(t) at $t_v$, u=1,2 ... m−1, v=1,2 ... n.

Still another alternative is:

$$\sum_{i=1}^{m}\sum_{j=1}^{n}[_i a_j(t_1)S_i(t_j)] = SM(t_1) \qquad (6)$$

$$\sum_{i=1}^{m}\sum_{j=1}^{n}[_i a_j(t_2)S_i(t_j)] = SM(t_2)$$

$$\vdots$$

$$\sum_{i=1}^{m}\sum_{j=1}^{n}[_i a_j(t_n)S_i(t_j)] = SM(t_n)$$

$$\sum_{i=1}^{m}\sum_{j=1}^{n}[\nabla\,_i a_j(t_1)S_i(t_j)] = \nabla SM(t_1)$$

$$\sum_{i=1}^{m}\sum_{j=1}^{n}[\nabla\,_i a_j(t_2)S_i(t_j)] = \nabla SM(t_2)$$

$$\sum_{i=1}^{m}\sum_{j=1}^{n}[\nabla\,_i a_j(t_n)S_i(t_j)] = \nabla SM(t_n)$$

$$\vdots$$

$$\sum_{i=1}^{m}\sum_{j=1}^{n}[\nabla^{m-1}\,_i a_j(t_n)S_i(t_j)] = \nabla^{m-1}SM(t_n)$$

wherein $\nabla^u\,_i a_j(t_v)$ and $\nabla^u SM(t_v)$ is uth summation of $_i a_j(t)$ and SM(t) from 0 to $t_v$. u=1,2 ... m−1, v=1,2 ... n.

The determinant in each matrix of Eqs(4)–(6) is not zero because $_i a_j(t)$ (i=1,2 ... m, j=1,2 ... n) are linear independent in $[T_0, T_1]$. Therefore, $S_1(t)$ has unique solution for Eqs (4)–(6).

Moreover, party B can mix the operations of differential, integration, difference, summation and sampling to create m×n linear independent equation set. For example, taking differential, integration, difference, summation for number of r1, r2, r3 and r4, and taking sample number of h, such that (r1+r2+r3+r4)h=m×n, party B can create m×n linear independent equation set for solving $S_i(t_j)$. However, the other methods are not described here for clarity.

Principles of the Invention IV

A particular choice of $_i a_j(t)$ is described below, wherein $_i a_j(t)$ thus selected are orthonormal for t within period $[T_0, T_1]$ $$\int_{T_0}^{T_1} {}_k a_l(x) {}_i a_j(x) dx = \begin{cases} 1; & \text{when } k = i \text{ and } l = j \\ 0; & \text{when } k \neq i \text{ or } l \neq j \end{cases}$$

wherein i,k=1,2 ... m, 1,j=1,2 ... n.
in this situation $$\int_{T_0}^{T_1} SM(x) {}_k a_l(x) dx = \int_{T_0}^{T_1} \left[ \sum_{i=1}^{m} \sum_{j=1}^{n} {}_i a_j(x) s_i(t_j) \right] {}_k a_l(x) dx = S_k(t_l)$$

Therefore, when the transformed and mixed signal SM(t) is sent to the receiver during time period [T₀, T₁] the receiver party multiplies the received signal with $_ka_l(t)$ (k=1,2 ... m, l=1,2 ... n) and integrates the result between time period [T₀, T₁] to obtain $S_k(t_l)$ (the Ith sample for the kth signal). This indicates that each sample value for each signal $S_i(t_j)$ can be calculated without the step of solving the linear algebraic equation set.

Below describes the way to orthonormalize the function group {$_ia_j(t)$ (i=1,2 ... m, j=1,2 ... n)} within time period [T₀, T₁].

First, m×n functions G₁(t), G₂(t) ... $G_{m \times n}(t)$ linearly independent within time period [T₀, T₁] are selected and let $$h(r, s) = \int_{T_0}^{T_1} G_r(x) G_s(x) dx; \quad r, s = 1, 2 \dots m \times n$$

$$A_0 = 1$$

$$A_v = \begin{vmatrix} h(1,1) & h(1,2) & h(1,3) & \dots & h(1,v) \\ h(2,1) & h(2,2) & h(2,3) & \dots & h(2,v) \\ h(3,1) & h(3,2) & h(3,3) & \dots & h(3,v) \\ \dots & \dots & \dots & \dots & \dots \\ h(v,1) & h(v,2) & h(v,3) & \dots & h(v,v) \end{vmatrix} \quad v = 1.2 \dots m \times n$$

then establishing the function $$A_v = \begin{vmatrix} h(1,1) & h(1,2) & h(1,3) & \dots & h(1,u) \\ h(2,1) & h(2,2) & h(2,3) & \dots & h(2,u) \\ \dots & \dots & \dots & \dots & \dots \\ h(u-1,1) & h(u-1,2) & h(u-1.3) & \dots & h(u-1,u) \\ G_1(t) & G_2(t) & G_3(t) & \dots & G_u(t)) \end{vmatrix}$$

$$u = 1.2 \dots m \times n$$

then the function $$l_u(t) = \frac{1}{\sqrt{A_{u-1} A_u}} P_u(t); \quad u = 1, 2 \dots m \times n$$

is orthonormal within time period [T₀, T₁].
Moreover, assume $_ia_j(t) = Q_{(I-1)n+j}(t)$ (i=1,2 ... m, j=1, 2 ... n), that is
$_1a_2(t)=Q_1(t)$
$_1a_2(t)=Q_2(t)$
•
•
•
$_1a_n(t)=Q_n(t)$
$_2a_1(t)=Q_{1+n}(t)$
$_2a_2(t)=Q_{2+n}(t)$
•
$_2a_n(t)=Q_{2n}(t)$
$_3a_1(t)=Q_{1+2n}(t)$
$_3a_2(t)=Q_{2+2n}(t)$
•
•
•
$_3a_2(t)=Q_{3n}(t)$
•
•
•
$_ma_n(t)=Q_{m \times n}(t)$ Apparently, function group {$_ia_j(t)$ (i=1,2 ... m, j=1,2 ... n)} are orthonormal within time period [T₀, T₁]. In above procedure for receiver party to restore $S_k(t_1)$, the step of solving linear algebraic equation is eliminated. However, m×n integrals are required, this will make the hardware complicated. The present invention provide following approach.

By choosing suitable function group {$G_u(t)|u=1,2 \dots m \times n$}, $_ka_l(t)$ can be expressed into Power series as following:

$$_k a_l(t) = {}_k a_l(b) + {}_k a_l'(b)(t-b) + \frac{1}{2!} {}_k a_l''(b)(t-b)^2 + \frac{1}{3!} {}_k a_l'''(b)(t-b)^3 \dots; \quad b \in R$$

Because the high frequency components of $_ka_l(t)$ are limited, the first several terms are sufficiently to represent $_ka_l(t)$. Assuming that first M terms are considered here, $_ka_l(t)$ can be expressed as:

$$_k a_l(t) \cong \sum_{q=0}^{M-1} \left[ \frac{1}{q!} {}_k a_l^{(q)}(b)(t-b)^q \right] \quad b \in R$$

then $$S_k(t_l) = \int_{T_0}^{T_1} SM(x) {}_k a_l(x) dx \quad (7)$$

$$= \sum_{q=0}^{M-1} \left[ \frac{1}{q!} {}_k a_l^{(q)}(b) \int_{T_0}^{T_1} SM(x)(x-b)^q dx \right]$$

The receiver party only need to store m×n×M data $$\frac{1}{q!} {}_k a_l^{(q)}(b) \ (k = 1, 2 \dots m, l = 1, 2 \dots n, q = 0, 1 \dots M; b \in R),$$

then calculate M integrals $$\int_{T_0}^{T_1} SM(x)(x-b)^q dx$$

upon receiving the SM(t). The m×n samples $S_k(t_1)$ are restored. In other word, receiver party only requires to prepare M integrators other than m×n.

Moreover, above approach is also applicable to the data compress technology. The m×n samples $S_k(t_1)$ can be approximately represented by M data:

$$\int_{T_0}^{T_1} SM(x)(x-b)^q\,dx; \quad q=0,1,2\ldots M-1; \quad b \in R$$

In other word, the function group $\{_i a_j(t)\ (i=1,2\ldots m, j=1,2\ldots n)\}$ are orthonormalized within time period $[T_0, T_1]$ by above procedure. The M data;

$$\int_{T_0}^{T_1} SM(x)(x-b)^q\,dx; \quad q=0,1,2\ldots M-1; \quad b \in R$$

are calculated by using known m×n samples $S_k(t_1)$. Afterward, Eq(7) is employed to restore m×n samples $S_k(t_1)$, wherein $$\int_{T_0}^{T_1} SM(x)(x-b)^q\,dx$$

are the data after compression and $$\frac{1}{q!}{}_k a_l^{(q)}(b)$$

refers to the restoring parameter. It is apparent that the invention is applicable both to transmission of mass data or the compression technology of signal

Principles of the Invention V

From above description, party A sends message to party B segment by segment with time duration $[T_0, T_1]$. However, party A need to send a synchronous signal before sending signal containing message.

Therefore, the duration $[T_0, T_1]$ is divided into first synchronous period $[T_0, T_1']$ for sending synchronous signal, and second information period $[T_1', T_1]$ for sending information $(T_0 < T_1' < T_1)$. The decrease of information period due to the incorporation of synchronous period will not influence bandwidth because the maximum bandwidth depends on $_i a_j(t)$ The various objects and advantages of the present invention will be more readily understood from the following detailed description when read in conjunction with the appended drawing, in which:

DETAILED DESCRIPTION OF THE INVENTION

Embodiment

Figure 1:
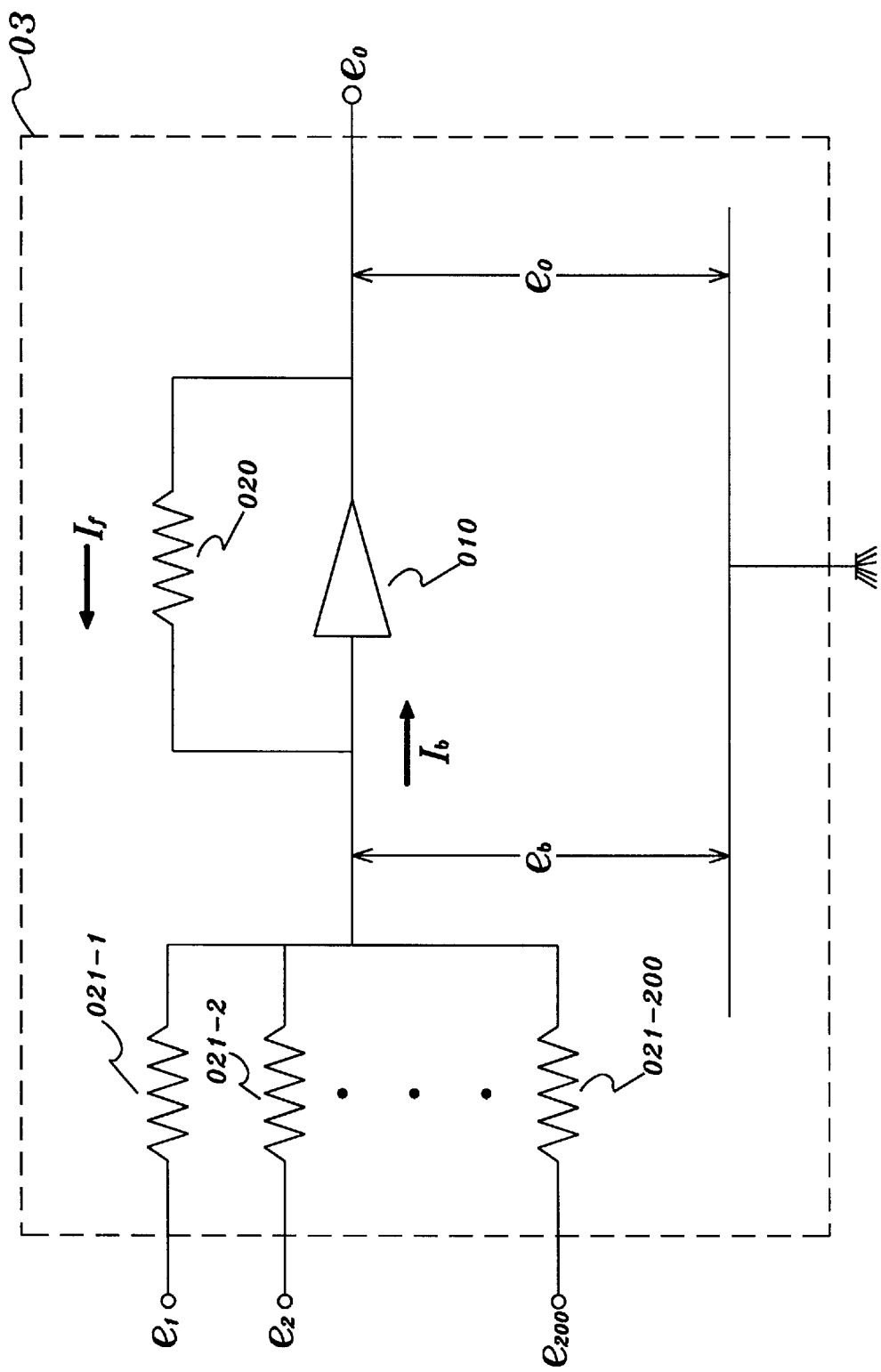
FIG. 1 is an analog adding circuit in the invention.

Hereinafter, a preferred embodiment is used to substantially explain the present invention, wherein the communication medium is assumed to be an ideal (distortionless) medium.

In this embodiment, the Si(t) in Eq. (3) is solved and below list some important issues.

1. The choice of $[T_0, T_1']$, $[T_1', T_1]$, m, n and $_i a_j(t)$:

Provided that $[T_0, T_1']=[0, \epsilon]$;
$[T_1', T_1]=[\epsilon, 5\epsilon]$, $\epsilon=1/1000$ sec;
m=5
n=8
$_i a_j(t)=G(j+40I-40,t)$, $i=1,2\ldots 5$; $j=1,2,\ldots,40$;
wherein $G(1,t)=\cos[2(400+151)\pi t]$; $1=1,2\ldots 200$.
and taking 40 samples $Si(t1), \ldots, Si(t40)$ for $Si(t)$ $(i=1,2,3,4,5)$ in $[T_0, T_1']=[0, \epsilon]$
and further assuming
$Sa(1)=S_1(t_1)$
$Sa(2)=S_1(t_2)$
•
•
•
$Sa(40)=S_1(t_{40})$
$Sa(41)=S_2(t_1)$
$Sa(42)=S_2(t_2)$
•
•
•
$Sa(80)=S_2(t_{40})$
•
•
•
$Sa(200)=S_5(t_{40})$.

Then the party A (sender) create a mixed transformed signal SM(t)

$$SM(t) = \sum_{u=1}^{200} [G(u,t) S_a(u)] \quad (7)$$

the SM(t) in above equation is transformed from party A to party B within $[T_1', T_1]=[\epsilon, 5\epsilon]$ and the maximum transmitting frequency is 3.4 kHz which depends on the function group $\cos[2(400+151)\pi t]$, not on the maximum frequency of Si(t).

2. The parameter setting in party B

The function group $\cos[2(400+151)\pi t]$ is linear independent in $t\in[\epsilon, 5\epsilon]$, therefore the below determinant is not zero.

$$W = \begin{vmatrix} G(1, X_1) & G(2, X_1) & \cdots & G(200, X_1) \\ G(1, X_2) & G(2, X_2) & \cdots & G(200, X_2) \\ \vdots & \vdots & \cdots & \vdots \\ G(1, X_{40}) & G(2, X_{40}) & \cdots & G(200, X_{40}) \\ G'(1, X_1) & G'(2, X_1) & \cdots & G'(200, X_1) \\ G'(1, X_2) & G'(2, X_2) & \cdots & G'(200, X_2) \\ \vdots & \vdots & \cdots & \vdots \\ G'(1, X_{40}) & G'(2, X_{40}) & \cdots & G'(200, X_{40}) \\ G''(1, X_1) & G''(2, X_1) & \cdots & G''(200, X_1) \\ \vdots & \vdots & \cdots & \vdots \\ G^{(4)}(1, X_{40}) & G^{(4)}(2, X_{40}) & \cdots & G^{(4)}(200, X_{40}) \end{vmatrix}$$

wherein X1,X2 ... X40 are corresponding to the sampling points within t∈[ε, 5ε].

For convenience's sake, let

D(1,j)=G(jX1)
D(2,j)=G(j,X2)
·
·
·
D(40,j)=G(j,X40)
D(41,j)=G'(j,X1)
D(42,j)=G'(j,X2)
·
·
·
D(80,j)=G'(j,X40)
D(81,j)=G''(j,X1)
·
·
·
D(200,j )=G$^{(4)}$(j,X40)

W can be written as $$W = \begin{vmatrix} D(1, 1) & D(1, 2) & \cdots & D(1, 200) \\ D(2, 1) & D(2, 2) & \cdots & D(2, 200) \\ \vdots & \vdots & \cdots & \vdots \\ D(200, 1) & D(200, 2) & \cdots & D(200, 200) \end{vmatrix}$$

let $$z(i, j) = \begin{vmatrix} D(1, 1) & D(1, 2) & \cdots & D(1, j-1) & D(1, j+1) & \cdots & D(1, 200) \\ D(2, 1) & D(2, 2) & \cdots & D(2, j-1) & D(2, j+1) & \cdots & D(2, 200) \\ \vdots & \vdots & \cdots & \vdots & \vdots & \cdots & \vdots \\ D(i-1, 1) & D(i-1, 2) & \cdots & D(i-1, j-1) & D(i-1, j+1) & \cdots & D(i-1, 200) \\ D(i+1, 1) & D(i+1, 2) & \cdots & D(i+1, j-1) & D(i+1, j+1) & \cdots & D(i+1, 200) \\ \vdots & \vdots & \cdots & \vdots & \vdots & \cdots & \vdots \\ D(200, 1) & D(200, 2) & \cdots & D(200, j-1) & D(200, j+1) & \cdots & D(200, 200) \end{vmatrix}$$

wherein i≧2, 199≧j
let $$Z(1, j) = \begin{vmatrix} D(2, 1) & D(2, 2) & \cdots & D(2, j-1) & D(2, j+1) & \cdots & D(2, 200) \\ D(3, 1) & D(3, 2) & \cdots & D(3, j-1) & D(3, j+1) & \cdots & D(3, 200) \\ \vdots & \vdots & \cdots & \vdots & \vdots & \cdots & \vdots \\ D(200, 1) & D(200, 2) & \cdots & D(200, j-1) & D(200, j+1) & \cdots & D(200, 200) \end{vmatrix}$$

$$Z(200, j) = \begin{vmatrix} D(1, 1) & D(1, 2) & \cdots & D(1, j-1) & D(1, j+1) & \cdots & D(1, 200) \\ D(2, 1) & D(2, 2) & \cdots & D(2, j-1) & D(2, j+1) & \cdots & D(2, 200) \\ \vdots & \vdots & \cdots & \vdots & \vdots & \cdots & \vdots \\ D(199, 1) & D(199, 2) & \cdots & D(199, j-1) & D(199, j+1) & \cdots & D(199, 200) \end{vmatrix}$$

$$Z(i, 1) = \begin{vmatrix} D(1, 2) & D(1, 3) & \cdots & D(1, 200) \\ D(2, 2) & D(2, 3) & \cdots & D(2, 200) \\ \vdots & \vdots & \cdots & \vdots \\ D(i-1, 2) & D(i-1, 3) & \cdots & D(i-1, 200) \\ D(i+1, 2) & D(i+1, 3) & \cdots & D(i+1, 200) \\ \vdots & \vdots & \cdots & \vdots \\ D(200, 2) & D(200, 3) & \cdots & D(200, 200) \end{vmatrix}$$

$$Z(i, 200) = \begin{vmatrix} D(1, 1) & D(1, 2) & \cdots & D(1, 199) \\ D(2, 1) & D(2, 2) & \cdots & D(2, 199) \\ \vdots & \vdots & \cdots & \vdots \\ D(i-1, 1) & D(i-1, 2) & \cdots & D(i-1, 199) \\ D(i+1, 1) & D(i+1, 2) & \cdots & D(i+1, 199) \\ \vdots & \vdots & \cdots & \vdots \\ D(200, 1) & D(200, 2) & \cdots & D(200, 199) \end{vmatrix}$$

moreover let $$R(u,v)=(-1)^{u+v}Z(u,v)/W \tag{8}$$

Wherein $u,v=1, 2, \ldots, 200$

The $R(u,v)$ in Eq(8) is the reverse-transform parameter, the value thereof are calculated by computer and then save in memory.

After party B receiving the signal as (7) from party A, party B uses differential means to obtain $SM(t)$, $SM'(t)$, $SM''(t)$, $SM'''(t)$ and $SM^{(4)}(t)$, and then takes sample to get 200 data including $SM(X1)$, $SM(X2)$, ... $SM(X40)$, $SM'(X1)$, $SM'(X2)$, ... $SM'(X40)$, ... $SM^{(4)}(X1)$, ... $SM^{(4)}(X40)$ For convenience, let
$\alpha(1)=SMG(X1)$
$\alpha(2)=SM(X2)$
•
•
•
$\alpha(40)=SM(X40)$
$\alpha(41)=SM'(X1)$
$\alpha(42)=SM'(X2)$
•
•
•
$\alpha(80)=G'(X40)$
$\alpha(81)=G\alpha(X1)$
•
•
$\alpha(161)=G^{(4)}(X1)$
•
•
$\alpha(200)=G^{(4)}(X40)$ $Sa(j)$ can be calculated by below equation $$S_a(j) = \sum_{i=1}^{200} [\alpha(i)R(i,j)] \tag{9}$$

wherein $i=1,2, \ldots 200$

In (9), $Sa(1), Sa(2)..Sa(40)$ are the samples in $S_1(t)$ taken by party A, $Sa(41), Sa(42) \ldots Sa(80)$ are the samples in $S_2(t)$ taken by party A, ... $Sa(161), Sa(162) \ldots Sa(200)$ are the samples in $S_5(t)$ taken by party A. Eq (9) is apparently a reverse-transform formula.

3. The hardware of party A (sender)

FIG. 1 is an analog adding circuit wherein 010 is a high-gain amplifier, 020 is feedback resistor, 021-1~021-200 are input resistors. If all input resistors have resistance same as that of the feedback resistor, then $$e_0=-(e_1+e_2+ \ldots +e_{200})$$

wherein $e_1, e_2 \ldots e_{200}$ are input voltages, and $e_0$ is output voltage.

Figure 2:
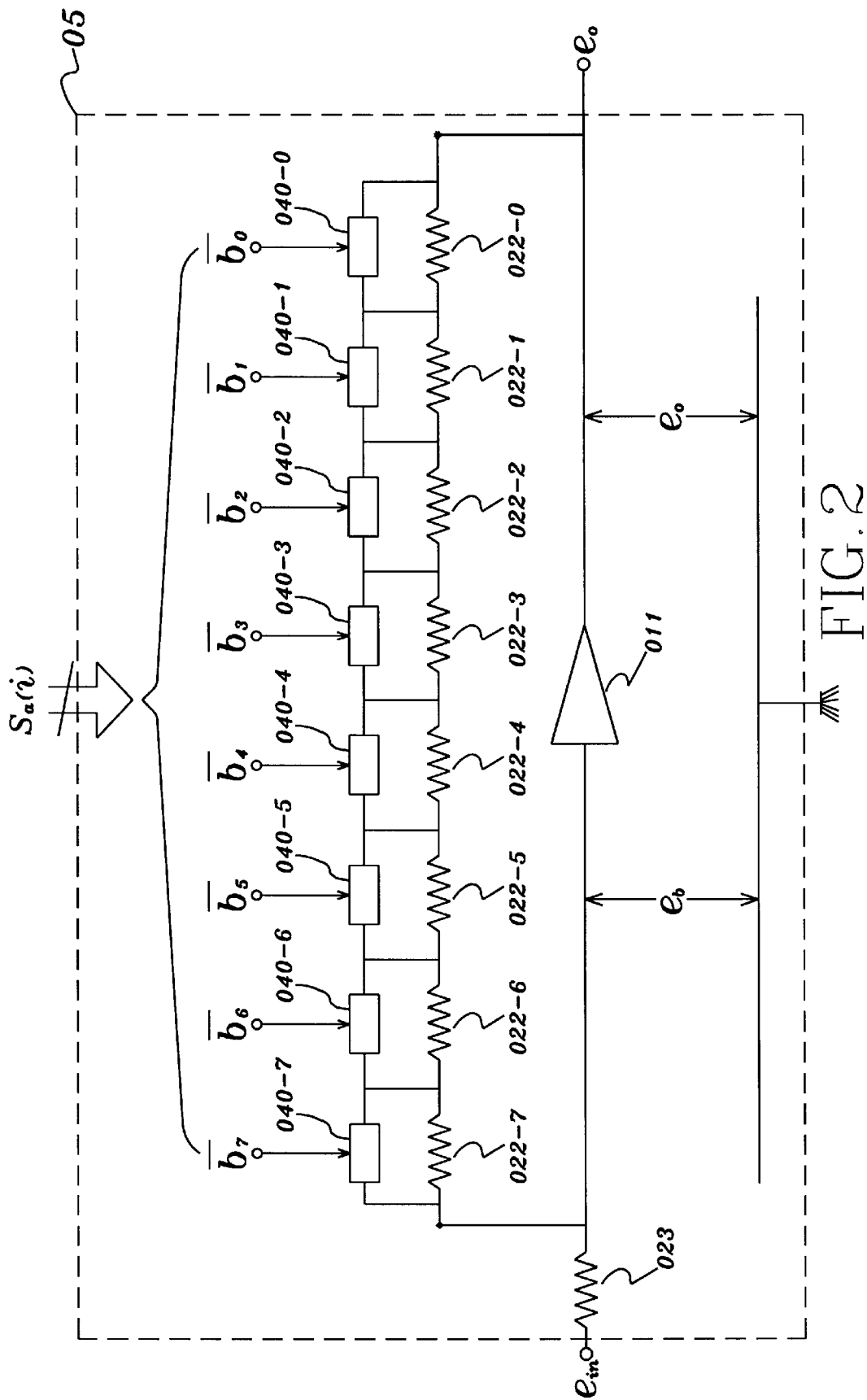
FIG. 2 show an inverted amplifier scheme in the invention.

FIG. 2 show an inverted amplifier scheme wherein output voltage $e_0$ equal to $e_{in}$ multiplied by sample data $Sa(i)$, $(i=1, 2 \ldots, 200)$ and then inverted.

Below are features of FIG. 2.
1. 011 is operational amplifier
2. 022-0~022-7 are eight serially-connected feedback resistors and the action thereof depend on the on-off state of electronic switch 040-0~040-7. 022-j is shorted and has no action when 040-j is on, and has action when 040-j is off. The on-off state of 040-j is controlled by $b_j$. 040-j is on when $b_j$ is low, $(j=0, 1,2 \ldots 7)$.
3. Setting $Sa(i)$ $(i=1,2 \ldots 200)$ as binary data in byte base, and has value of $b_7X2^7+b_6X2^6+ \ldots b_1X2^1+b_0X2^0$.
4. Let resistance of 022-0~022-7 are $r, 2r, 2^2r, \ldots 2^7r$, respectively, the resistance of input resistor 023 is $r$.
5. The resistance of feedback resistor will be controlled by $Sa(i)$ $(i=1,2 \ldots 200)$ and becomes $b_7X2^7r+ b_6X2^6r+ \ldots b_1X2^1r+b_0Xr=Sa(i)r$.

Therefore, input/output voltage has below relationship $$e_0=-Sz(I)e_{in}$$

Figure 3:
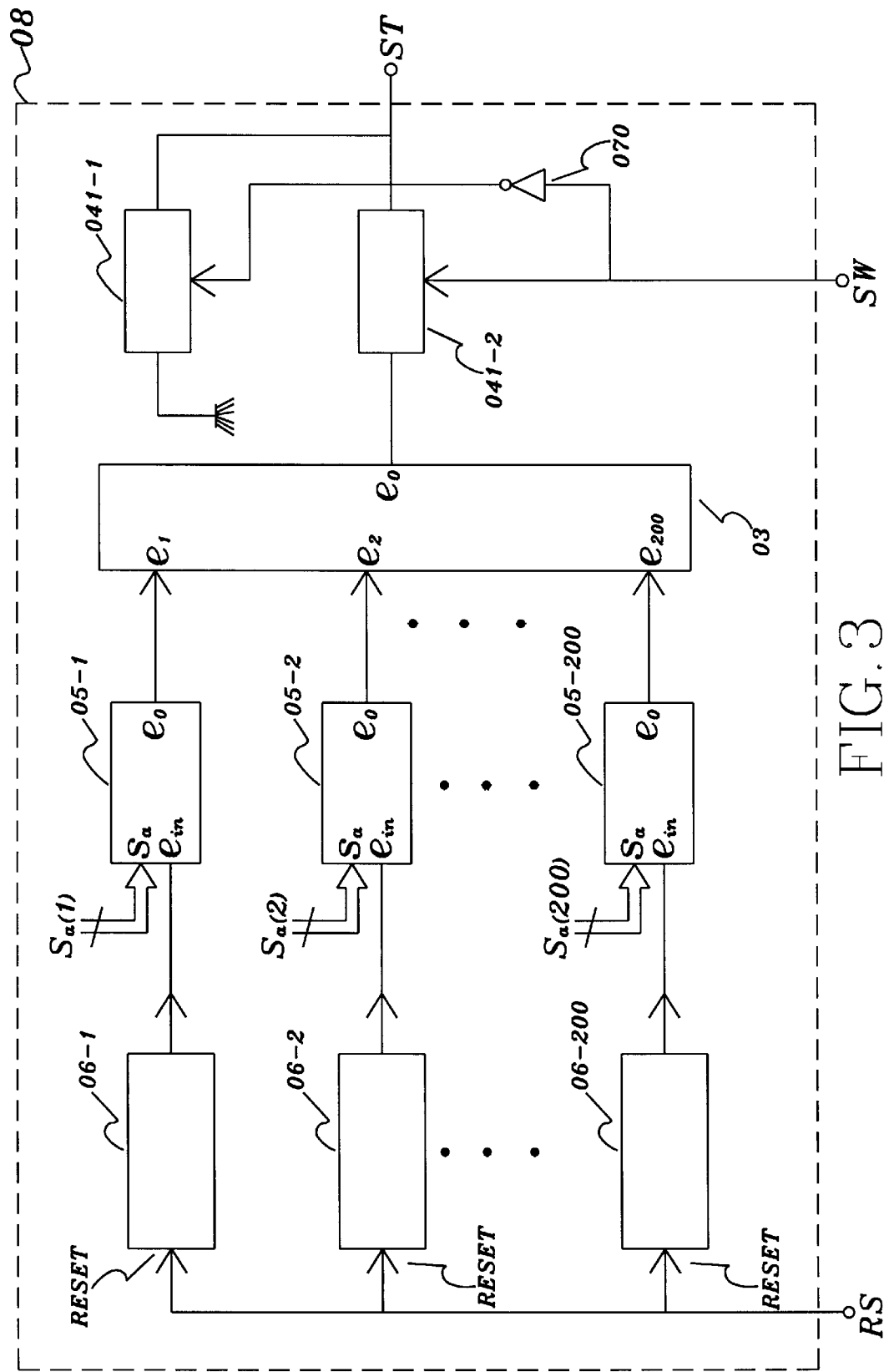
FIG. 3 shows the generating circuit for mixed signal SM(t).

FIG. 3 shows the generating circuit for mixed signal $SM(t)$ which has following features.

1. 06-1 is the generating circuit for functions $\cos[2(400+15l)\pi t]$ $(l=1,2, \ldots 200$, l is time variable) which generate those functions when signal in RESET off.
2. 05-1~05-200 is the circuit shown in FIG. 2.
3. 03 is the circuit shown in FIG. 1.
4. 041-1, 041-2 are electronic switch, 070 is inverter, 041-1 OFF and 041-2 ON when SW HIGH.
5. When RS signal disappears and SW HIGH, ST generates signal $SM(t)$ with below form:

$$SM(t) = \sum_{i=1}^{200} [Sa(i)\cos[2(400+\varepsilon)\pi t]]$$

Figure 4:
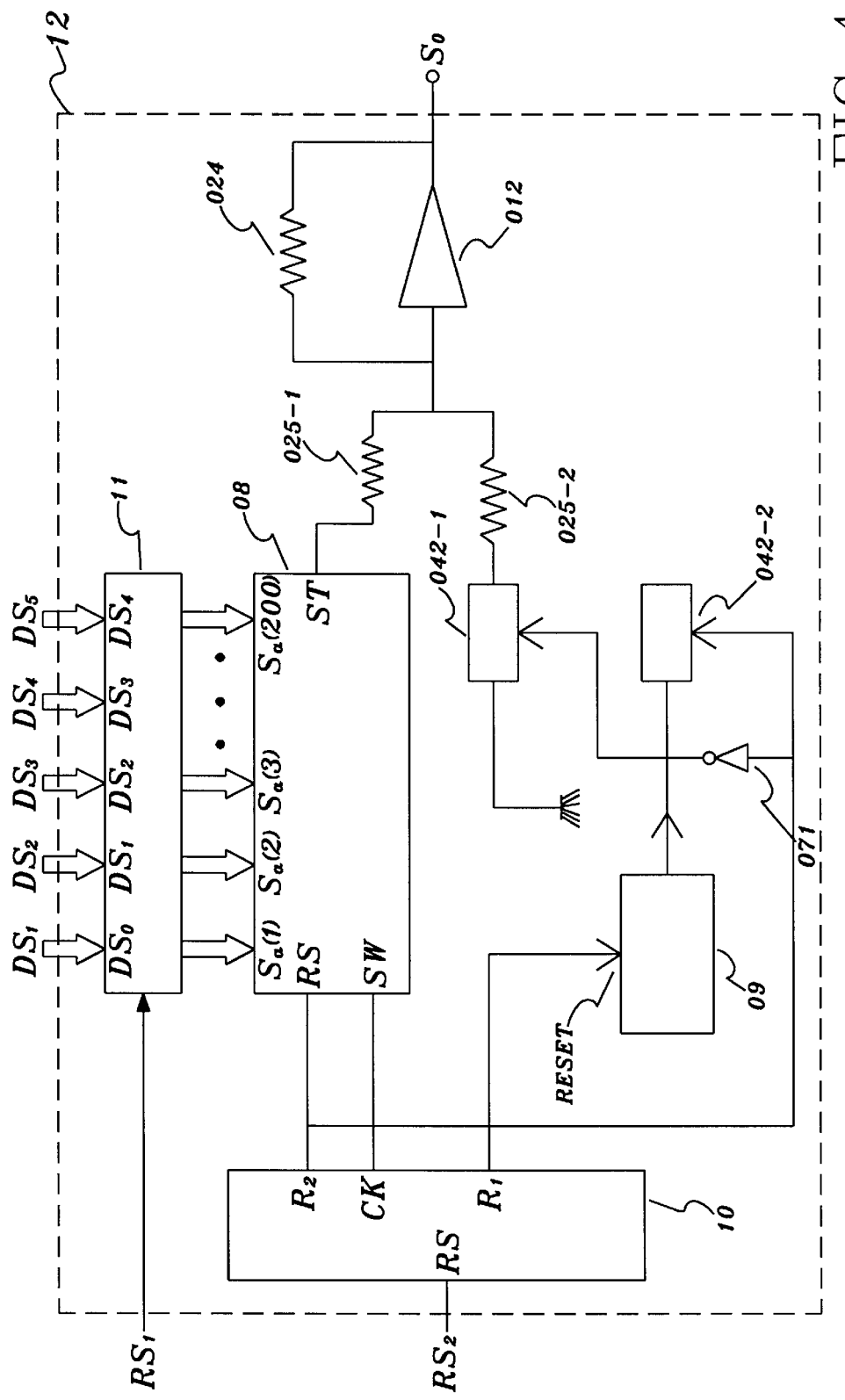
FIG. 4 is the schematic diagram of the control circuit 12 which outputs the mixing signal and the synchronous signal alternatively.

FIG. 4 has following features

Figure 5:
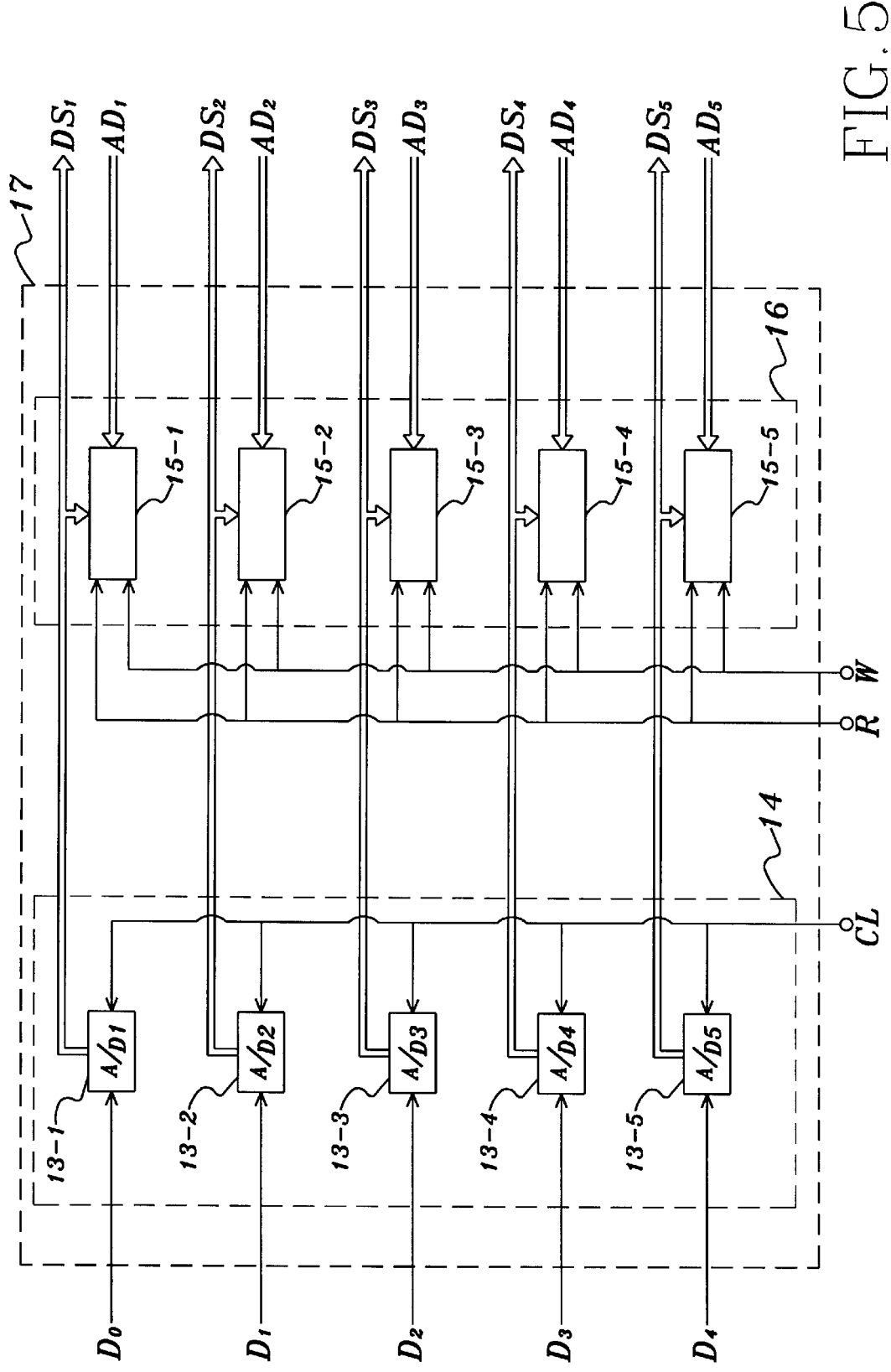
FIG. 5 is the control circuit 17 which make the analog signal be transferred into the digital signal, then be storage into the memory.
Figure 6:
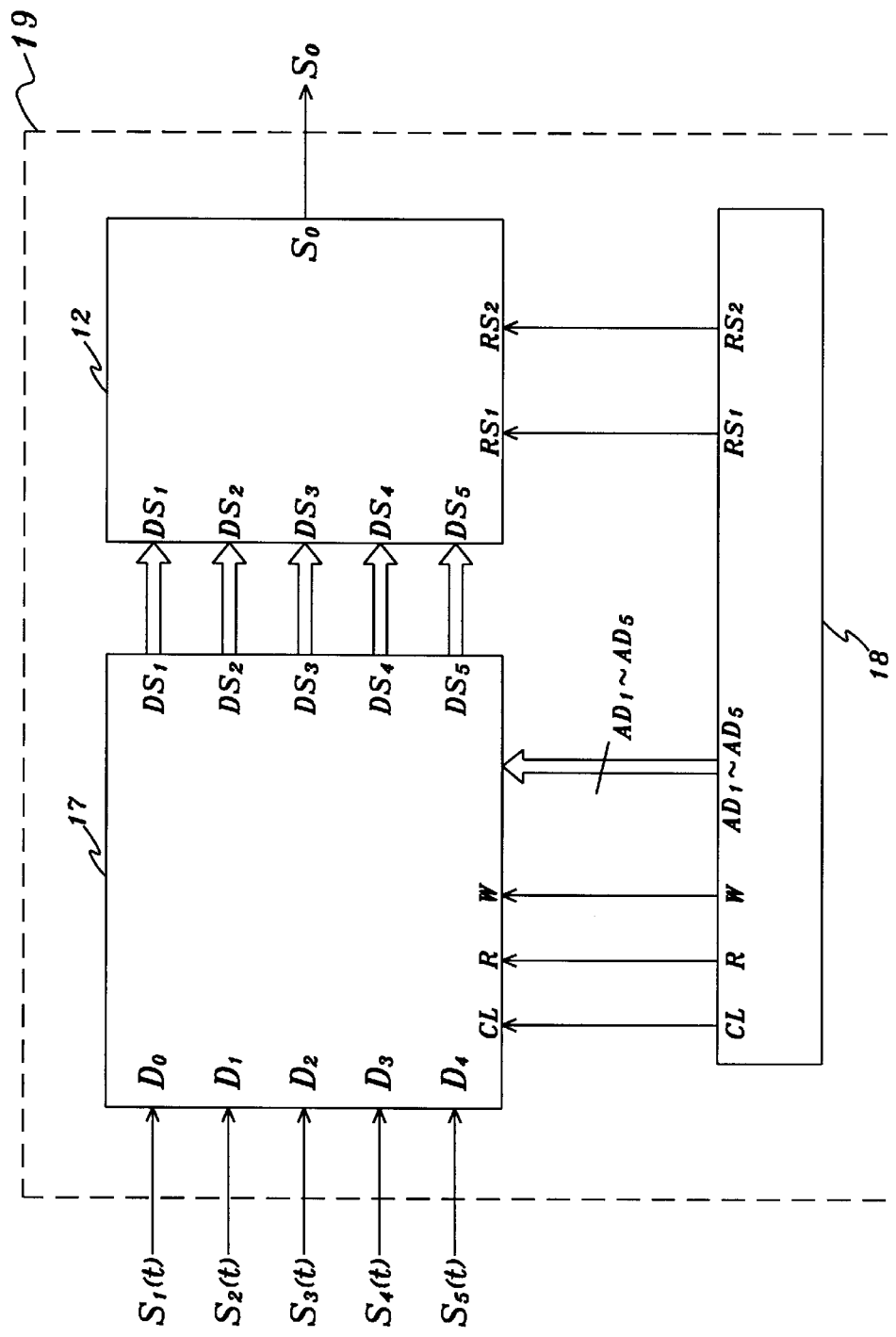
FIG. 6, is the whole hardware of party A.
Figure 12:
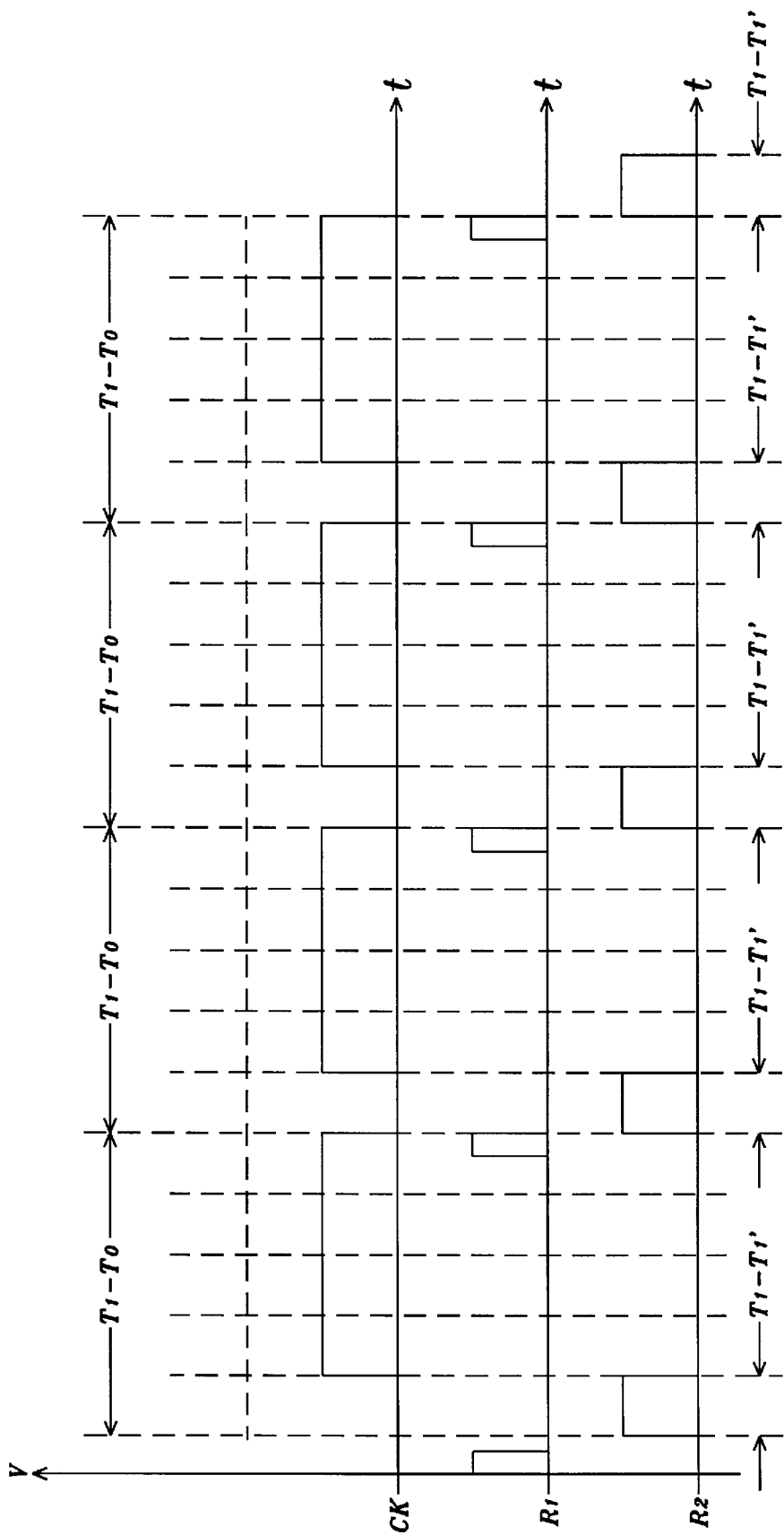
FIG. 12 is the timing schematic diagram of the R1, R2 and CK which shown in the block 10 of FIG. 4.

1. DATA BUS $DS_1$~$DS_5$ come from $DS_1$~$DS_5$ in FIG. 5 which send $Sa(1)$~$Sa(200)$ to data register 11, wherein DS1 sends $Sa(1)$~$Sa(40)$, DS2 sends $Sa(41)$~$Sa(80)$ ... DS5 sends $Sa(161)$~$Sa(200)$, RS1 is the timing control terminal for data.
2. 08 is circuit in FIG. 3, 09 is synchronous signal generator and sends synchronous signal when RESET signal is over, 012 is operational amplifier, 024 is feedback resistor of 012, 025-1 and 025-2 are input resistors with same resistance, 042-1 and 042-2 are electronic switch, 042-1 is off and 042-2 is on when R2 is HIGH, 071 is inverter.
3. 10 is a timing control circuit which begin to function when RS is excited and generate timing as shown in FIG. 12.
4. Therefore, output $S_0$ sends synchronous signal within $[T_0, T_1']$ and mixed transformed signal $SM(t)$ within $[T_1', T_1]$ FIG. 5 has following features 1. The box 14 enclosed by dashed line has 5 A/D converters 13-1~13-5 to convert the analog signals from $D_0$~$D_4$ to digital signals, wherein CL is CLOCK control for sampling.
2. The box 16 enclosed by dashed line has 5 memory means 15-1~15-5 to store the digital data from A/D converters 13-1~13-5, wherein $AD_1$~$AD_5$ are address bus, R and W are read and write control.
3. From the control of W end, the digital data from ND converters 13-1~13-5 are stored in 5 memory means 15-1~15-5, from the control of R end, the stored digital data are read and output from $DS_1$~$DS_5$ FIG. 6 is the whole hardware of party A, wherein 12 is circuit in FIG. 4, 17 is circuit in FIG. 5. Moreover, 18 is a well-know timing circuit and the description is omitted.

4. The hardware of party B

Figure 7:
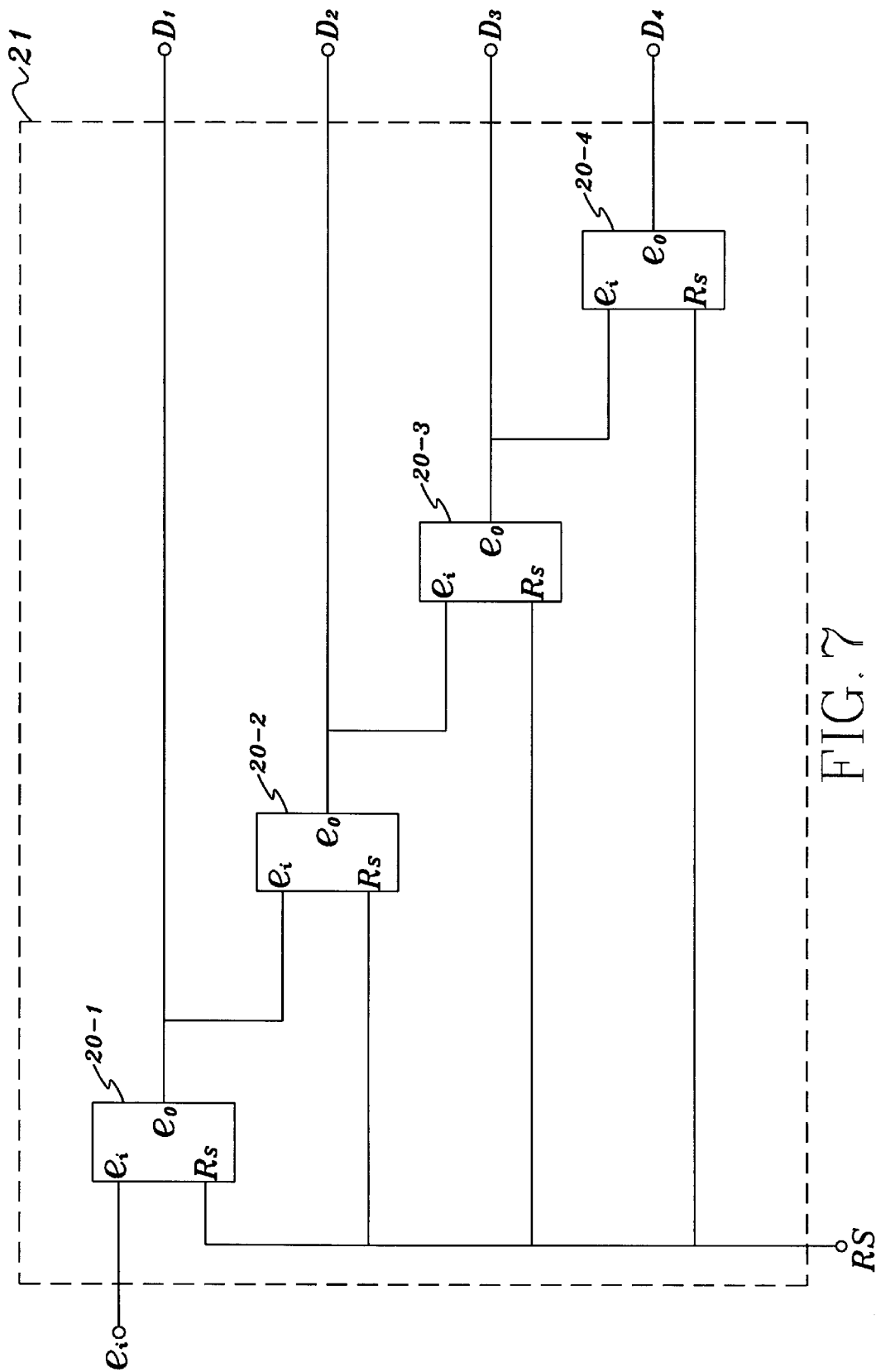
FIG. 7 is a figure of a differential circuit comprising four differential means.

FIGS. 7–10 is block diagram of party B. FIG. 7 is a figure of a differential circuit comprising four differential means 20-1, 20-2, 20-3 and 20-4, and the description is omitted for they are well known art.

13

Figure 8:
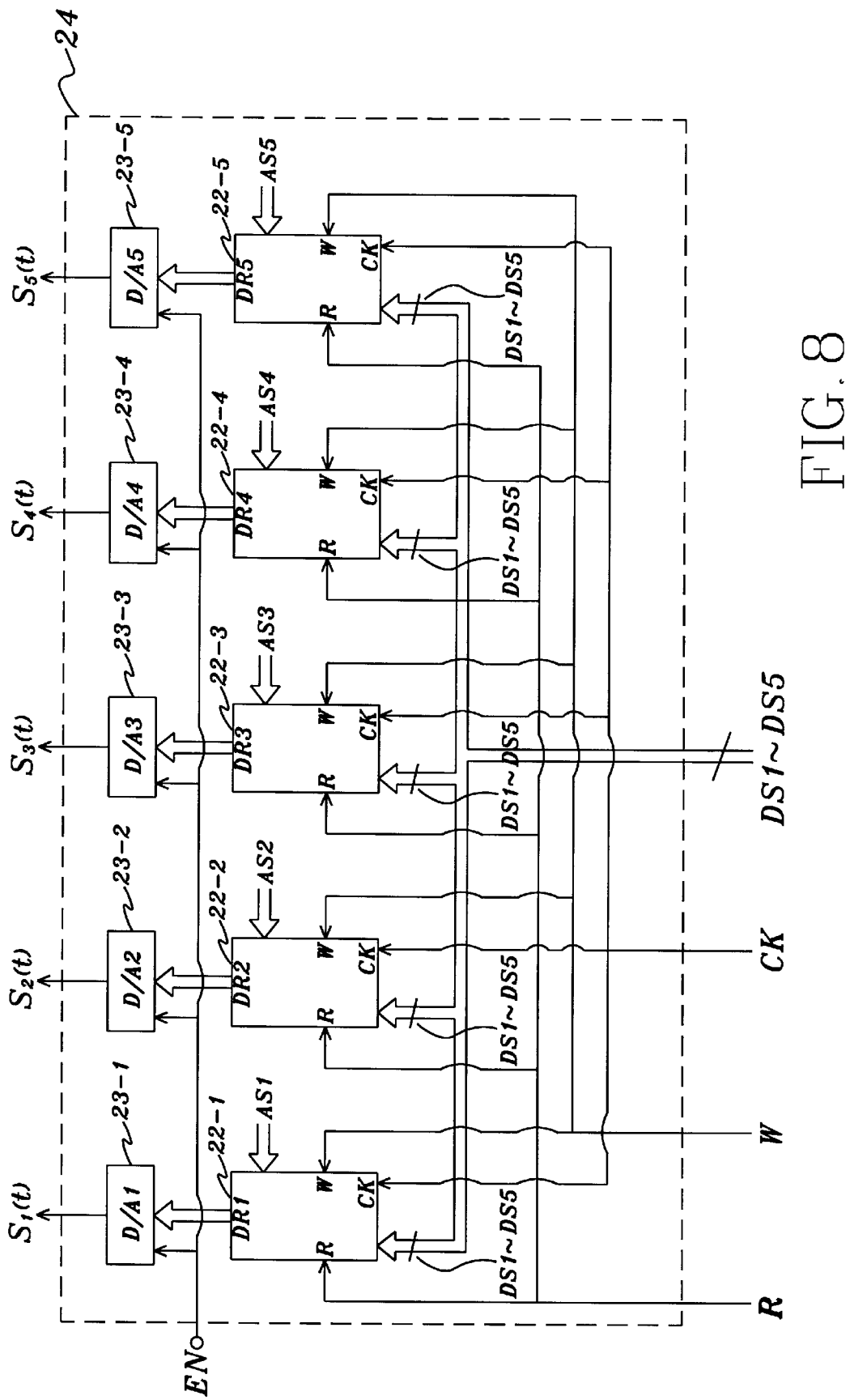
FIG. 8 is the separated circuit 24 which separates the several kind of the original type of the mixing signal.
Figure 9:
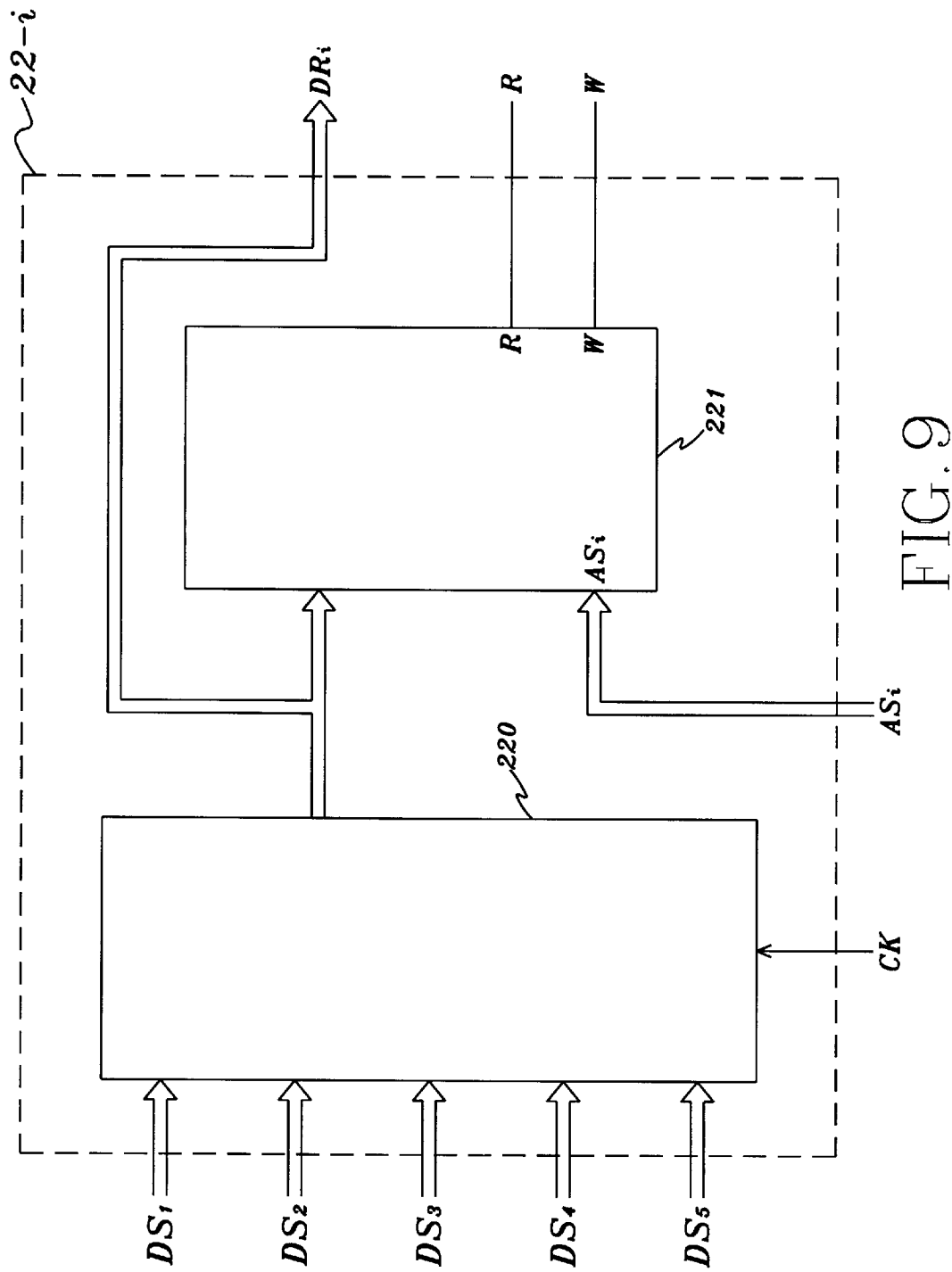
FIG. 9 is the control circuit 22-i which can resolve the parallel equation, and store the resolve result into the memory.

FIGS. 8 and 9 have following features
1. 22-i(i=1,2 ... 5) in FIG. 8 is circuit in FIG. 9
2. 220 in FIG. 9 is a circuit for solving linear equation set and has parametric memory for storing reverse-transform parameter R(u,v) (u,v=1,2 ... 200), CE is a timing control end.
3. 221 in FIG. 9 is memory for storing the result of 220, wherein Asi(i=1,2 ... 5) are address bus, DRi(i=1, 2 ... 5) are data bus and R and W are read and write control ends.
4. In FIG. 8, 23-1~23-5 are D/A converters, EN is chip enable, R, W, CK are the same as R, W, CK in FIG. 9, data bus DS1~DS5 are DS1~DS5 in FIG. 9

Figure 10:
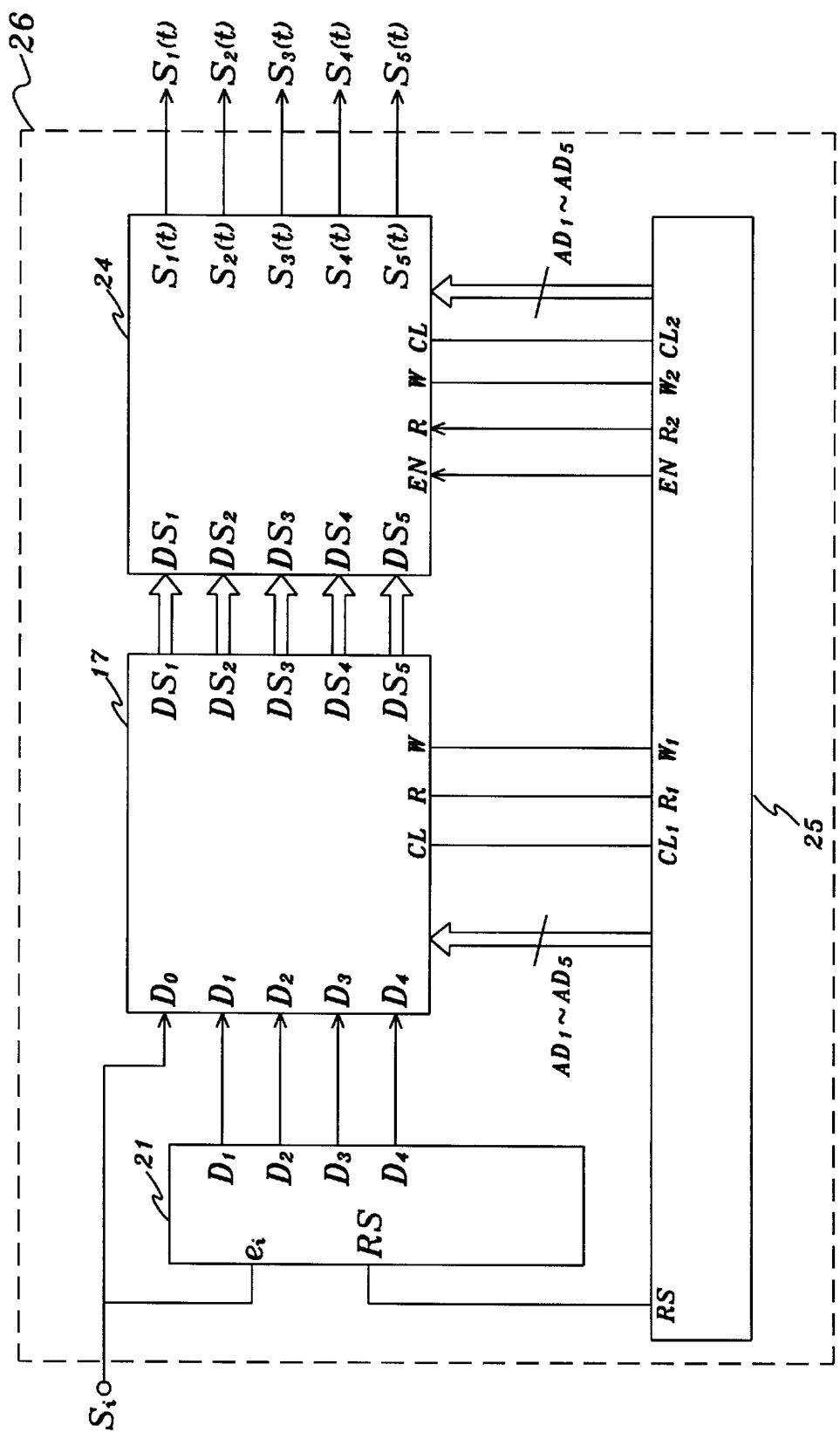
FIG. 10. is the whole hardware of party A.
Figure 11:
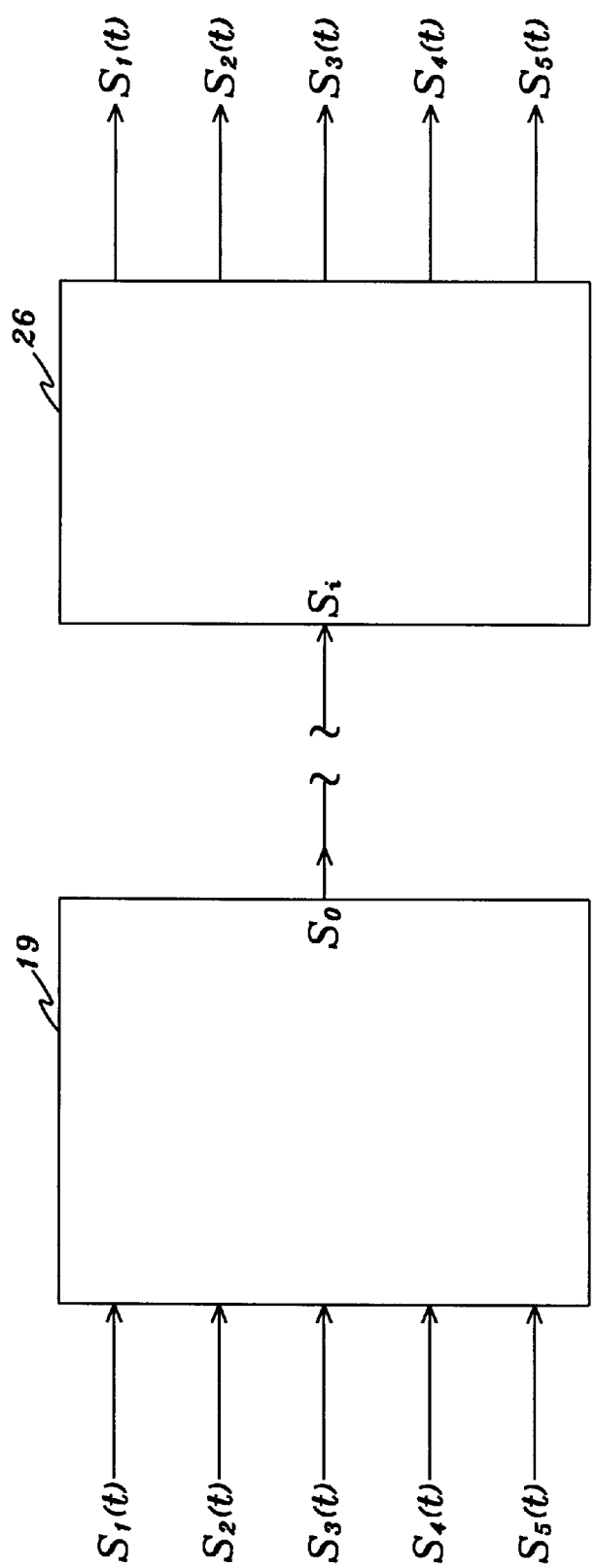
FIG. 11 is the schematic diagram of the all embodiment according by this invention, the number 19 is the party A shown in FIG. 6, the number 26 is the party B shown in FIG. 10.

FIG. 10 is the whole hardware of party A and has below features.
1. 21 is the differential circuit in FIG. 7, 17 is that shown in FIG. 5, 21 execute first, second, third, fourth order differential operation on SM(t) to get SM'(T), SM''(T), SM'''(T), SM$^{(4)}$(T), and send those signal with SM(t) to $D_0$~$D_4$ in 17, those signals are digitized by 5 A/D converters in 17 and stored in memory 15-1~15-5 in 17.
2. 24 is same as that shown in FIG. 8, the terminals around the dashed box are the same as those in FIG. 8.
3. 25 is a timing control circuit, which initial 21 to execute first, second, third, fourth order differential operation on Si and store those signals with Si into 17, then 5 A/D converters 13-1~13-5 in 17 digitize those signal and store the result in 15-1~15-5, the data in 15-1~15-5 are fetched to 220 in 22-i (i=1,2 ... 5) for solving linear equation set, the solution are stored in 221, the data in 221 are sent to 23-1~23-5 to convert into analog signal $S_1(5)$–$S_5(t)$, thus reverse transforming the data.
4. Circuit 25 is well known and the description thereof is omitted for clarity.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:
1. A method for mixing a plurality of signals, comprising the steps of:
(a) using a plurality of data bus for receiving a plurality of analog signals within a time period, each signal being continuous and being able to be mathematically represented by an equation of $S_i(t)$ within the time period $[T_0, T_1]$, wherein m is integer, i=1,2, ..., m, t is time variable, $T_0, T_1 \in R$, $t \in [T_0, T_1]$;
(b) using a timing control circuit to sample the signals $S_i(t)$ within the time period $[T_0, T_1]$ and obtain n samples for each signal, said samples being mathematically represented by $S_i(t_j)$, wherein n is integer, $t_j \in [T_0, T_1]$, j=1, 2, ... n;
(c) using a generating circuit to generate a predetermined time dependent function group which is a linear independent set and can be mathematically represented by $_ia_j(t)$, wherein i=1,2 ... m, j=1,2 ... n;
(d) using a multiplying circuit to multiply each sample $S_i(t_j)$ with a corresponding time dependent function $_ia_j(t)$ and generating a transformed signal which can be mathematically represented as

$$S_i^0(t) = \sum_{j=1}^{n} [_ia_j(t)S_i(t_j)];$$

(e) using an adding circuit to sum up all transformed signals $S_i^0(t)$ to form a mixed transformed signal which be mathematically represented as SM(t), wherein $$SM(t) = \sum_{i=1}^{m} [S_i^0(t)].$$

2. The method as in claim 1, wherein the time dependent function group $_ia_j(t)$ (i=1 ... m, j=1,2 ... n) are such selected that every function of $_ia_j(t)$ is linear independent for $t \in [T_0, T_1]$.

3. The method as in claim 1, wherein the time dependent function group is mathematically represented as $_ka_l(t)$ (k=1, 2 ... m, l=1,2 ... n) within the time period $[T_0, T_1]$ and is mathematically determined by the following functions:

selecting a set of m×n functions $G_1(t), G_2(t) ... G_{m \times n}(t)$ which are linearly independent within the time period $[T_0, T_1]$;

letting $$h(r, s) = \int_{T_0}^{T_1} G_r(x)G_s(x)\,dx; \quad rs = 1, 2 ... m \times n;$$

$$A_0 = 1;$$

$$A_v = \begin{vmatrix} h(1,1) & h(1,2) & h(1,3) & ... & h(1,v) \\ h(2,1) & h(2,2) & h(2,3) & ... & h(2,v) \\ h(3,1) & h(3,2) & h(3,3) & ... & h(3,v) \\ ... & ... & ... & ... & ... \\ h(v,1) & h(v,2) & h(v,3) & ... & h(v,v) \end{vmatrix}; \quad v = 1.2 ... m \times n;$$

then establishing the function $$A_v = \begin{vmatrix} h(1,1) & h(1,2) & h(1,3) & ... & h(1,u) \\ h(2,1) & h(2,2) & h(2,3) & ... & h(2,u) \\ ... & ... & ... & ... & ... \\ h(u-1,1) & h(u-1,2) & h(u-1,3) & ... & h(u-1,u) \\ G_1(t) & G_2(t) & G_3(t) & ... & G_u(t)) \end{vmatrix}; \quad u = 1.2 ... m \times n;$$

then the function $$Q_u(t) = \frac{1}{\sqrt{A_{u-1}A_u}}P_u(t); \quad u = 1, 2 ... m \times n; \text{ and then letting}$$

$$_ia_j(t) = Q_{(i-1)n+j}(t) \ (i=1,2 ... m, l=1,2 ... n).$$

4. The method as in claim 3, wherein $_k a_l(t)$ (k=1,2 ... m, l=1,2 ... n) are orthonormal within the time period $[T_0, T_1]$.

5. The method as in claim 1, further comprising a step for solving m×n $S_i(t_j)$ (i=1,2 ... m, j=1,2 ... n), said step taking m×n samples to establish a m×n linear equation set with unknowns $S_1(t_1), S_1(t_2), S_1(t_3)...S_1(t_n), S_2(t_1), S_2(t_2)...S_m(t_1), S_m(t_2),...S_m(t_n)$ and using a hardware to solve this linear equation set with linear algebraic method to get $S_i(t_j)$ (i=1, ... m, j=1,2 ... n).

6. The method as in claim 1, further comprising a step for solving m×n $S_i(t_j)$ (i=1,2 ... m, j=1,2 ... n) said step establishing m differential equations for SM(t) with respect to t and with each term having different order including zero, then taking n samples to m differential equations within t∈$[T_0, T_1]$, and establishing a m×n linear equation set with unknowns $S_1(t_1), S_1(t_2), S_1(t_3)...S_1(t_n), S_2(t_1), S_2(t_2)...S_m(t_1), S_m(t_2),...S_m(t_n)$ and solving this linear equation set with linear algebraic method to get $S_i(t_j)$ (i=1, ... m, j=1, 2 ... n).

7. The method as in claim 1, further comprising a step for solving m×n $S_i(t_j)$ (i=1,2 ... m, j=1,2 ... n), said step performing m integration operation to the transformed signal from timed=0 to time=t, and with each term having different order including zero, then taking n samples to m integral equations within t∈$[T_0, T_1]$, and establishing a m×n linear equation set with unknowns $S_1(t_1), S_1(t_2), S_1(t_3)...S_1(t_n), S_2(t_1), S_2(t_2)...S_m(t_1), S_m(t_2),...S_m(t_n)$ and solving this linear equation set with linear algebraic method to get $S_i(t_j)$ (i=1, ... m, j=1,2 ... n).

8. The method as in claim 1, further comprising a step for solving m×n $S_i(t_j)$ (i=1,2 ... m, j=1,2 ... n), said step establishing r differential equations for SM(t) (r<m) with respect to t and with each term having different order including-zero, then performing m−r integration operation to SM(t) from time=0 to time=t, and with each term having different order including zero, taking n samples to r differential equations and m−r integral equation within t∈$[T_0, T_1]$, and establishing a m×n linear equation set with unknowns $S_1(t_1), S_1(t_2), S_1(t_3)...S_1(t_n), S_2(t_1), S_2(t_2)...S_m(t_1), S_m(t_2),...S_m(t_n)$ and solving this linear equation set with linear algebraic method to get $S_i(t_j)$ (i=1, ... m, j=1,2 ... n).

9. The method as in claim 1, further comprising a step for solving m×n $S_i(t_j)$ (i=1,2 ... m, j=1,2 ... n), said step establishing m difference equations for SM(t) with respect to t and with each term having different order including zero, then taking n samples to m difference equations within t∈$[T_0, T_1]$, and establishing a m×n linear equation set with unknowns $S_1(t_1), S_1(t_2), S_1(t_3)...S_1(t_n), S_2(t_1), S_2(t_2)...S_m(t_1), S_m(t_2),...S_m(t_n)$ and solving this linear equation set with linear algebraic method to get $S_i(t_j)$ (i=1, ... m, j=1, 2 ... n).

10. The method as in claim 1, further comprising a step for solving m×n $S_i(t_j)$ (i=1,2 ... m, j=1,2 ... n), said step performing m summation operation to SM(t) from time=0 to time=t, and with each term having different order including zero, then taking n samples to m summation equations within t∈$[T_0, T_1]$, and establishing a m×n linear equation set with unknowns $S_1(t_2), S_1(t_3)...S_1(t_n), S_2(t_1), S_2(t_2)...S_m(t_1), S_m(t_2),...S_m(t_n)$ and solving this linear equation set with linear algebraic method to get $S_i(t_j)$ (i=1, ... m, j=1, 2 ... n).

11. The method as in claim 1, further comprising a step for solving m×n $S_i(t_j)$ (i=1,2 ... m, j=1,2 ... n), said step establishing r difference equations for SM(t) (r<m) with respect to t and with each term having different order including zero, then perform m−r summation operation to SM(t) from time=0 to time=t, and with each term having different order including zero, taking n samples to r difference equations and m−r summation equation within t∈$[T_0, T_1]$, and establishing a m×n linear equation set with unknowns $S_1(t_1), S_1(t_2), S_1(t_3)...S_1(t_n), S_2(t_1), S_2(t_2)...S_m(t_1), S_m(t_2),...S_m(t_n)$ and solving this linear equation set with linear algebraic method to get $S_i(t_j)$ (i=1, ... m, j=1, 2 ... n).

12. The method as in claim 1, further comprising a step for solving m×n $S_i(t_j)$ (i=1,2 ... m, j=1,2 ... n), said step establishing r1 differential equations for SM(t) (r1=0 or <=m) with respect to t and with each term having different order including zero, establishing r2 difference equations for SM(t) (r2=0 or <=m) with respect to t and with each term having different order including zero, then performing r3 integration operation to SM(t) (r3=0 or <=m) from time=0 to time=t, and with each term having different order including zero, then performing r4 summation operation to SM(t) (r4=0 or <=m) from time=0 to time=t, and with each term having different order including zero, wherein r1+r2+r3+r4=m, then taking n samples to r1 differential equations, r2 difference equations, r3 integral equation and r4 summation equations within t∈$[T_0, T_1]$: and establishing a m×n linear equation set with unknowns $S_1(t_2), S_1(t_3)...S_1(t_n), S_2(t_1), S_2(t_2)...S_m(t_1), S_m(t_2),...S_m(t_n)$ and solving this linear equation set with linear algebraic method to get $S_i(t_j)$ (i=1, ... m, j=1,2 ... n).

13. The method as in claim 1, wherein the predetermined time dependent function group $_i a_j(t)$ (i=1, ... m, j=1,2 ... n) for SM(t) are linear independent such that the $S_i(t)$ within the time period $[T_0, T_1]$ can be solved by linear algebra technique.

14. The method as in claim 4, further comprising a step for restoring m×n $S_i(t_j)$ (i=1,2 ... m, j=1,2 ... n), from SM(t), wherein $\{_i a_j(t) \text{ (i=1,2 ... m, j=1,2 ... n)}\}$ are orthonormal within the time period $[T_0, T_1]$, said step comprising: multiplying $_i a_j(t)$ to SM(t) and integrating the result within time period $[T_0, T_1]$ to get $S_i(t_j)$ (i=1,2 ... m, j=1,2 ... n).

15. The method as in claim 4, further comprising a step for restoring m×n $S_k(t_l)$ (k=1,2 ... m, l=1,2 ... n) from SM(t), wherein $\{_i a_j(t) \text{ (i=1, 2 ... m, j=1,2 ... n)}\}$ are orthonormal within the time period $[T_0, T_1]$, said step comprising:

preparing m×n×M restoring parameters $$\frac{1}{q!} {}_k a_l^{(q)}(b) \ (k = 1, 2 \ldots m, l = 1, 2 \ldots n, q = 0, 1 \ldots M; b \in R),$$

calculating M data, $$\int_{T_0}^{T_1} SM(x)(x-b)^q \, dx;$$

q=0, 1, 2 ... M−1; b∈R calculating $S_k(t_l)$ using following equation $$S_k(t_l) = \sum_{q=0}^{M-1} \left[ \frac{1}{q!} {}_k a_l^{(q)}(b) \int_{T_0}^{T_1} SM(x)(x-b)^q \, dx \right].$$

16. The method as in claim 4, wherein after obtaining SM(t) by using functions $$S_i^0(t) = \sum_{j=1}^{n} [_i a_j(t) S_i(t_j)]$$

and $$SM(t) = \sum_{i=1}^{m} [S_i^0(t)],$$

further comprising the following step:
choose $\{_i a_j(t) \ (i=1,2 \ldots m, j=1,2 \ldots n)\}$ by method in claim 3;
calculate SM(t) using $$S_i^0(t) = \sum_{j=1}^{n} [_i a_j(t) S_i(t_j)]$$

and $$SM(t) = \sum_{i=1}^{m} [S_i^0(t)]$$

calculating M compression data by using the function of $$\int_{T_0}^{T_1} SM(x)(x-b)^q \, dx;$$

q=0, 1, 2 ... M−1; b∈R using SM(t), wherein t within period [$T_0$, $T_1$].

17. The method according to claim 1, further comprising the following steps after step (d):
using the timing control circuit to divid the time period [$T_0$, $T_1$] into a synchronous time period and an information time period;
sending a synchronous signal in the synchronous period;
sending mixed transformed signal SM(t) in the information period.

18. A hardware device comprising:
m A/D converters for sampling $S_i(t)$ and digitizing the samples;
m×n signal generators for generating $_i a_j(t)$ signals;
m×n multipliers for calculating $_i a_j(t)$ and $S_i(t)$, wherein $S_i(t_j)$ is the j-th sampling of $S_i(t)$;
an adder for calculating $$\sum_{j=1}^{n} [_i a_j(t) S_i(t_j)]$$

a synchronous signal generator for generating synchronous signal within the time period [$T_0$, $T_1$]; and
a timing controller for regulating the timing control of above components.

19. A hardware device for separating a mixed transformed signal SM(t), comprising:
a first circuit for detecting a synchronous signal;
(m×n)$^2$ memory device for use in solving linear algebra equations;
at least one logic circuit for pre-handling the mixed transformed signal SM(t) to obtain a output result;
a plurality of A/D converters for sampling said output result to obtain a plurality of sampling results and digitizing the sampling results;
a plurality of adders and multipliers;
a calculating means for calculating original samples $S_i(t_j)$ of the $S_i(t)$ according to the data stored in original samples $S_i(t_j)$ of the $S_i(t)$ and then outputting from the A/D converters; and
a timing controller for regulating the timing control of above components.

20. The device as in claim 19, further comprising m D/A converters for transforming the original samples $S_i(t_j)$ (i=1, 2 ... m, j=1,2 ... n) to analog signals.

21. The device as in claim 19, wherein said logic circuit comprises a plurality of differential circuits for taking differential to SM(t).

22. The device as in claim 19, wherein said logic circuit comprises a plurality of difference circuits for taking difference to SM(t).

23. The device as in claim 19, wherein said logic circuit comprises a plurality of integration circuits for taking integration to SM(t) from 0 to t.

24. The device as in claim 19, wherein said logic circuit comprises a plurality of summation circuits for taking summation to SM(t) from 0 to t.

* * * * *